United States Patent
Yang et al.

(10) Patent No.: US 9,083,261 B2
(45) Date of Patent: Jul. 14, 2015

(54) NEUTRAL POINT CLAMPED CONVERTER CONTROL SYSTEM AND CONTROL METHOD AND COMPENSATION UNIT

(71) Applicant: GENERAL ELECTRIC COMPANY, Schenectady, NY (US)

(72) Inventors: Wenqiang Yang, Shanghai (CN); Ling Luo, Shanghai (CN); Yunfeng Liu, Shanghai (CN); Anthony Michael Klodowski, Hardy, VA (US); Robert Gregory Wagoner, Roanoke, VA (US); Robert Allen Seymour, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 13/682,996

(22) Filed: Nov. 21, 2012

(65) Prior Publication Data

US 2013/0128632 A1 May 23, 2013

(30) Foreign Application Priority Data

Nov. 22, 2011 (CN) .......................... 2011 1 0373940

(51) Int. Cl.
*H02M 7/487* (2007.01)
*H02M 5/458* (2006.01)

(52) U.S. Cl.
CPC .............. *H02M 5/458* (2013.01); *H02M 7/487* (2013.01)

(58) Field of Classification Search
CPC .... H02M 7/487; H02M 5/4585; H02M 5/453
USPC ..................................................... 363/41, 43
See application file for complete search history.

(56) References Cited

U.S. PATENT DOCUMENTS 5,627,742 A * 5/1997 Nakata et al. ................... 363/98
6,031,738 A 2/2000 Lipo et al.

(Continued)

FOREIGN PATENT DOCUMENTS

JP 07-79574 3/1995
JP 07135782 A2 5/1995

OTHER PUBLICATIONS

Marchesoni et al., "A New Control Strategy for Neutral-Point-Clamped Active Rectifiers", IEEE Transactions on Industrial Electronics, vol. 52, Issue 2, pp. 462-470, Apr. 2005.

(Continued)

*Primary Examiner* — Harry Behm
*Assistant Examiner* — Matthew Grubb
(74) *Attorney, Agent, or Firm* — Global Patent Operation; Douglas D. Zhang

(57) ABSTRACT

A control system includes a fundamental control unit, first and second compensation control units, a switch control unit, and a switch implementation unit. The fundamental control unit generates fundamental commands to implement fundamental power conversion operation for a converter. The first compensation control unit generates a first compensation signal for injection into the fundamental command to balance neutral point voltage when the converter is in operation in a first state. The second compensation control unit generates a second compensation signal for injection into the fundamental command to balance neutral point voltage when the converter is in operation in a second state. The switch control unit detects first and second states of the converter and provides first and second switch signals respectively. The switch implementation unit switches the fundamental control unit to communicate with the first and second compensation control units according to the first and second switch signals respectively.

20 Claims, 8 Drawing Sheets

(56) References Cited

U.S. PATENT DOCUMENTS

| | | |
|---|---|---|
| 6,058,031 A | 5/2000 | Lyons et al. |
| 6,534,949 B2 | 3/2003 | Szczesny et al. |
| 7,495,938 B2 | 2/2009 | Wu et al. |
| 7,573,732 B2 | 8/2009 | Teichmann et al. |
| 7,920,393 B2 | 4/2011 | Bendre et al. |

OTHER PUBLICATIONS

Cuzner et al., "Implementation of a Four Pole Neutral-Point Clamped Three Phase Inverter with Low Common Mode Voltage Output", Conference Record of the 2007 IEEE Industry Applications Conference, 42nd IAS Annual Meeting, pp. 923, Sep. 23-27, 2007.

Watson et al., "A Complete Harmonic Elimination Approach to DC Link Voltage Balancing for a Cascaded Multilevel Rectifier", IEEE Transactions on Industrial Electronics, vol. 54, Issue 6, pp. 2946, Dec. 2007.

Sánchez, "Space Vector Pulse-Width Modulation Multiphase Voltage-Source Converters", University of Vigo, Jan. 9, 2009, Vigo, Spain.

Pereira et al., "Experimental Comparison of Carrier and Space Vector PWM Control Methods for Three-Phase NPC Converters", International Conference on Renewable Energies and Power Quality (ICREPQ'09), Apr. 15-17, 2009, Valencia, Spain.

Marchesoni et al., "Voltages Balancing in Neutral-Point-Clamped Active Rectifiers based on Current Harmonic Distortion".

\* cited by examiner

NEUTRAL POINT CLAMPED CONVERTER CONTROL SYSTEM AND CONTROL METHOD AND COMPENSATION UNIT

BACKGROUND

The described embodiments relate generally to neutral point clamped (NPC) converter control systems and methods for balancing neutral point (mid-point) voltage. This type of voltage balancing is especially useful in renewable power generation systems such as wind and photovoltaic power generation systems for example.

Neutral point clamped (NPC) converters are widely applied in power conversion systems. One challenge for a NPC converter topology is neutral point voltage imbalance. For optimal operation of a typical NPC converter such as a three-level converter, the neutral point voltage imbalance should be maintained at about zero volts. Typically, a pulse width modulation (PWM) control strategy can be used to balance (center) the neutral point voltage.

For PWM balance control strategies, the basic principle is to inject an additional compensation control signal during PWM modulation. By this technique, the neutral point current is regulated to charge or discharge a capacitor bank to compensate for any capacitor voltage imbalance (neutral point voltage imbalance). However, when only one additional compensation control signal is used for neutral point voltage balancing during PWM modulation, it may be not effective for all conditions of the power conversion system.

Therefore, it is desirable to provide a NPC converter control system and method to improve performance of balancing neutral point voltage.

BRIEF DESCRIPTION

In accordance with one embodiment disclosed herein, a control system for providing commands to a multi-level converter for balancing neutral point voltage of the multi-level converter is provided. The control system includes a fundamental control unit, first and second compensation control units, a switch control unit, and a switch implementation unit. The fundamental control unit generates fundamental commands to implement fundamental power conversion operation for the multi-level converter. The first compensation control unit generates a first compensation signal for injection into the fundamental command to balance the neutral point voltage when the multi-level converter is in operation in a first state. The second compensation control unit generates a second compensation signal for injection into the fundamental command to balance the neutral point voltage when the multi-level converter is in operation in a second state. The first state is different from the second state. The switch control unit detects the state of the multi-level converter and provides a first switch signal and a second switch signal respectively corresponding to the first state and the second state. The switch implementation unit switches the fundamental control unit to communicate with the first compensation control unit according to the first switch signal and switches the fundamental control unit to communicate with the second compensation control unit according to the second switch signal.

In accordance with another embodiment disclosed herein, a control method for balancing neutral point voltage of a multi-level converter is provided. The control method includes obtaining a reference parameter related to the state of the multi-lever converter; determining the state of the multi-lever converter according to the reference parameter; generating a fundamental command from a fundamental control unit to implement fundamental power conversion of the multi-level converter; when the state of the multi-level converter is in a first state, switching the fundamental control unit to communicate with a first compensation control unit, generating a first compensation signal with the first compensation control unit, and injecting the first compensation signal into the fundamental command to balance the neutral point voltage of the multi-level converter; and when the state of the multi-level converter is in a second state, switching the fundamental control unit to communicate with a second compensation control unit, generating a second compensation signal with the second compensation control unit, and injecting the second compensation signal into the fundamental command to balance the neutral point voltage of the multi-level converter, wherein the first state is different from the second state.

In accordance with yet another embodiment disclosed herein, a compensation control unit for providing a compensation command for balancing neutral point voltage of a multi-level converter is provided. The compensation control unit includes a difference element, a neutral point voltage regulator, and an odd harmonics signal generator. The difference element obtains a voltage error signal representative of neutral point voltage imbalance. The neutral point voltage regulator receives the voltage error signal and produces a fundamental compensation command for driving the voltage error signal towards zero. The odd harmonics signal generator transforms the fundamental compensation command to odd harmonics signals in the dq coordinates.

DRAWINGS

These and other features, aspects, and advantages of the present invention will become better understood when the following detailed description is read with reference to the accompanying drawings in which like characters represent like parts throughout the drawings, wherein.

Figure 2:
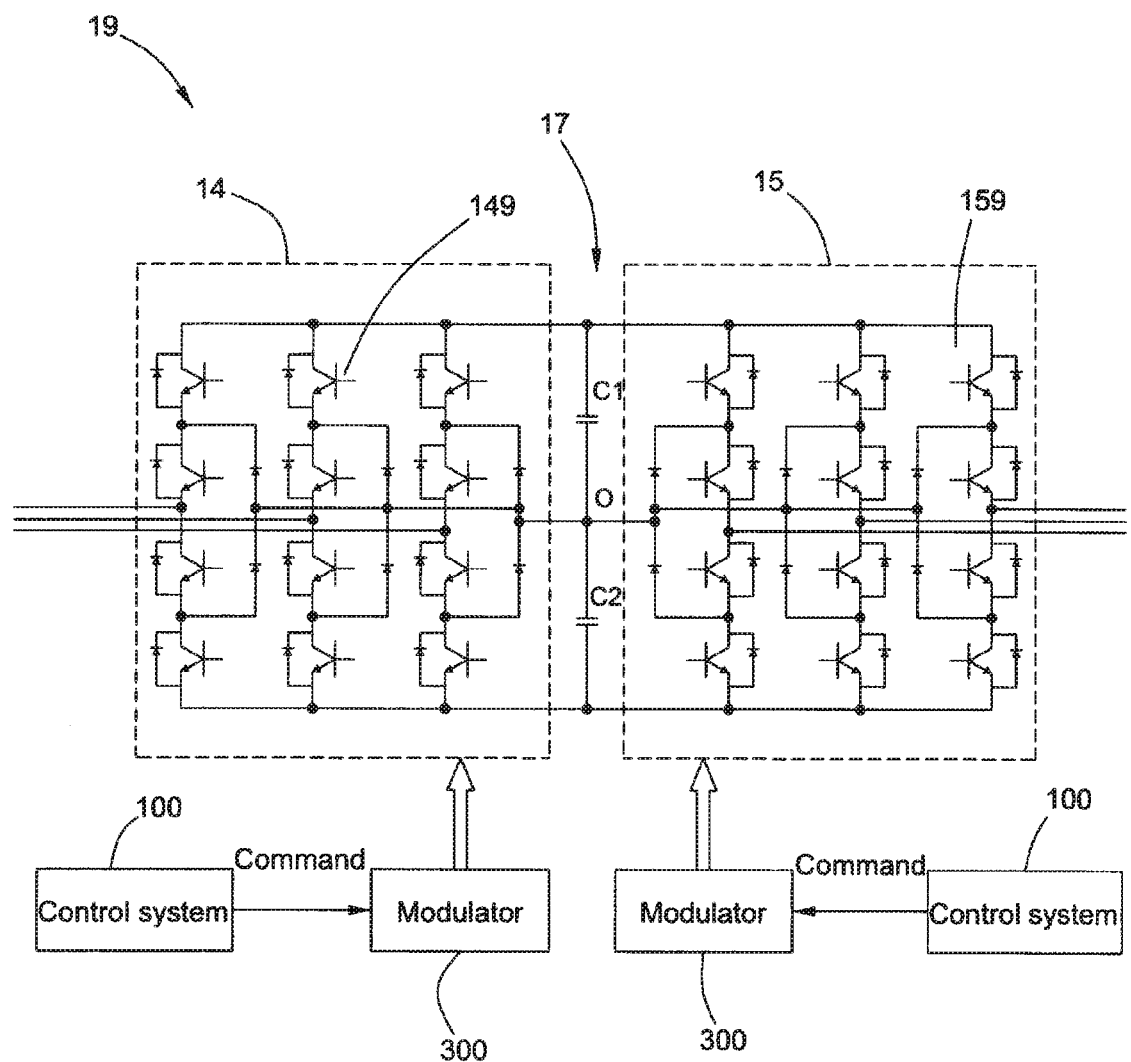
FIG. 2 is a circuit diagram of two converters of the power conversion system of FIG. 1, together with control systems and modulators.
Figure 4:
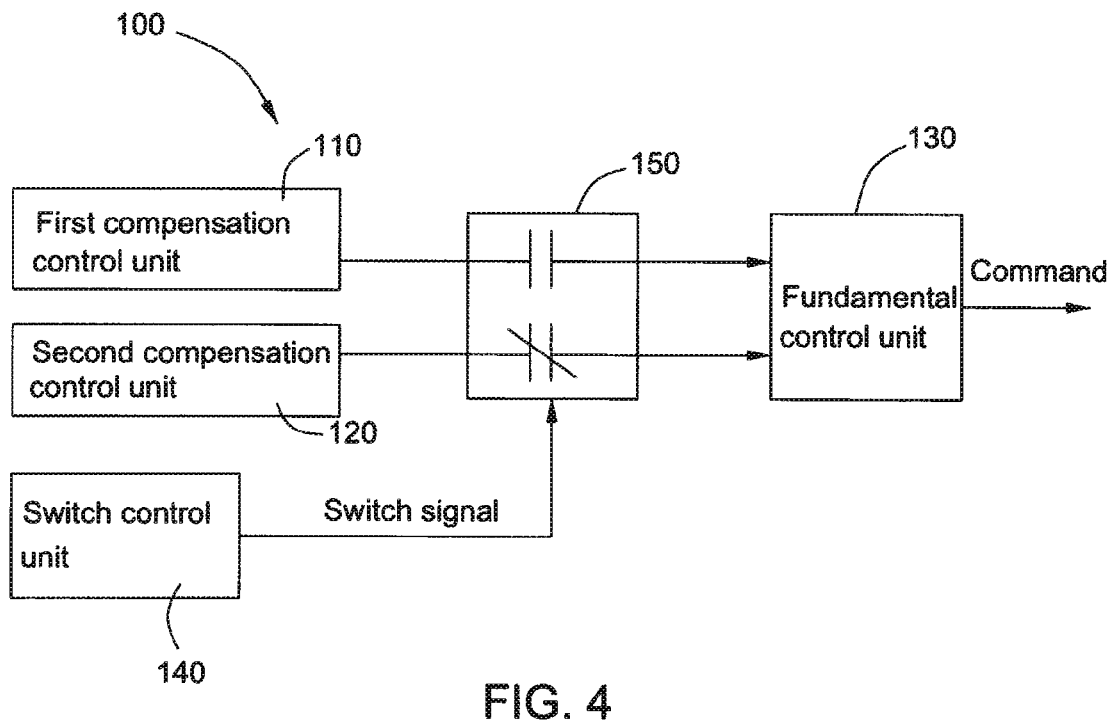
FIG. 4 is a block diagram of an example control system for using in the embodiment of FIG. 2.
Figure 10:
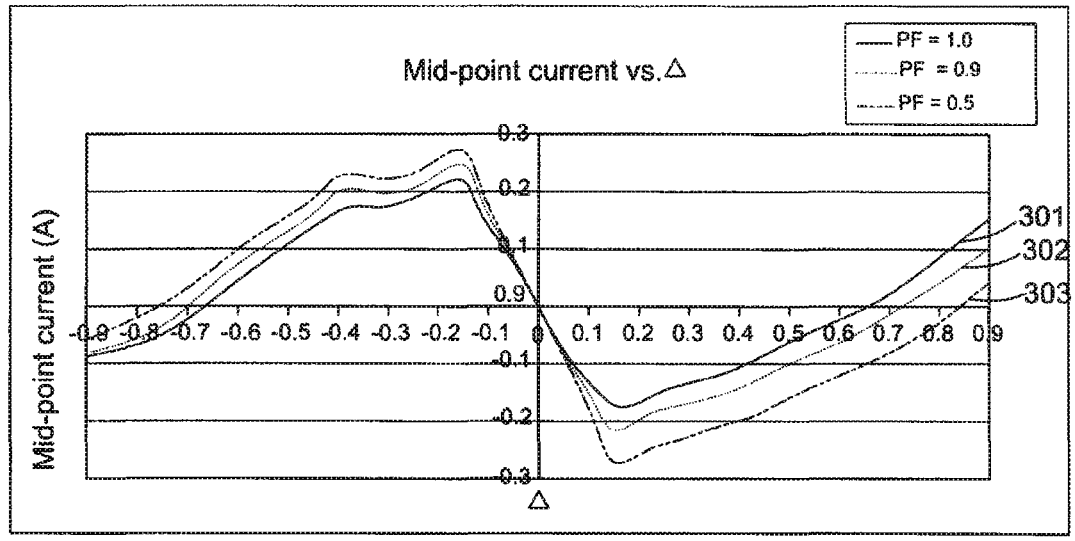
Figure 11:
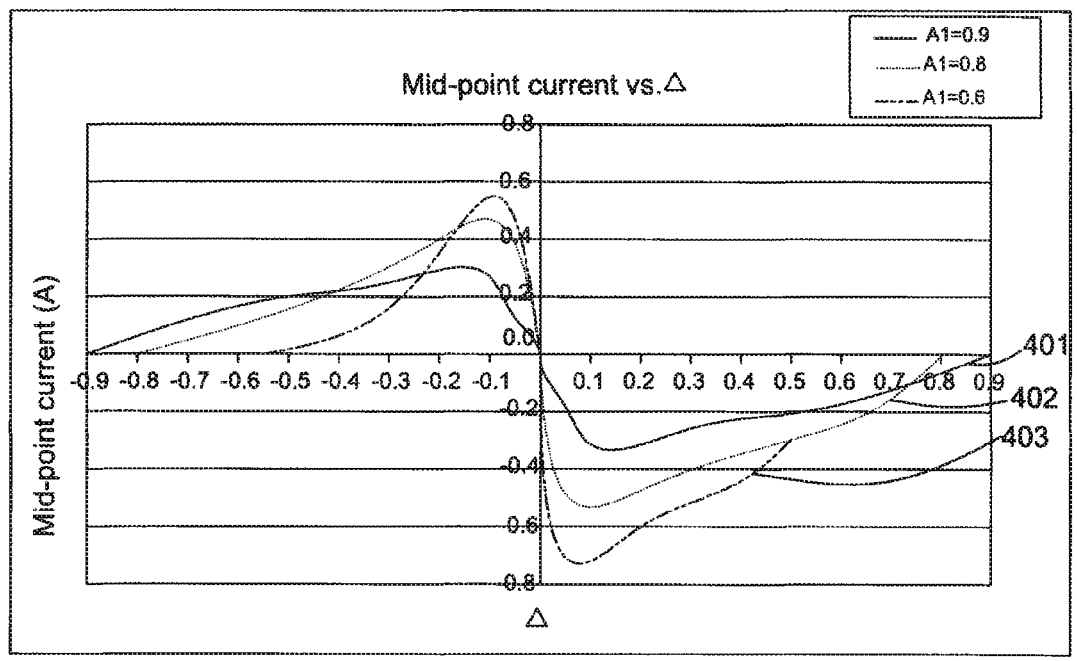

FIG. 10 is a diagram of a neutral point current, as a function of a neutral point voltage imbalance of the control system of FIG. 2 using the second compensation unit of FIG. 4 and operating in normal operation state; and FIG. 11 is a diagram of a neutral point current, as a function of a neutral point voltage imbalance of the control system of FIG. 2 using the second compensation unit of FIG. 4 and operating in wind free state.

DETAILED DESCRIPTION

Embodiments disclosed herein relate generally to power conversion systems with improved neutral point voltage balance capabilities. As used herein, "normal operation state" refers to a power conversion system working in a state when the active power is not equal to zero (namely the power factor is not equal to zero or has wind state), and a "wind free state" refers to a power conversion system working in a state when the active power is equal to zero (namely the power factor is equal to zero or no wind state), "high power factor state" refers to a power conversion system working in a state when the active power is relatively high (namely the absolute value of power factor is relatively high, such as greater than 0.2), and "low power factor state" refers to a power conversion system working in a state when the active power is relatively low (namely the absolute value of power factor is relatively low, such as less than 0.2). For simplicity of illustration, the normal operation state and the wind free state are respectively referenced as a first state and a second state of the power conversion system. The high power factor state and the low power factor state are also respectively referenced as a first state and a second state of the power conversion system.

More particularly, the embodiments of the improved neutral point voltage balance capability described herein are based on neutral point clamped (NPC) converter control systems and methods which can produce two different additional compensation control signals used to balance neutral point voltage respectively in the first state and the second state. The two different compensation control signals are respectively suitable for the first and second states of the power conversion system, and thus, the power conversion system using the NPC converter control system and method can achieve a better performance when balancing the neutral point voltage of the power conversion system.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or reactive and are connected or otherwise coupled together (e.g., as one or more integrated circuit chips) to provide the described function.

Figure 1:
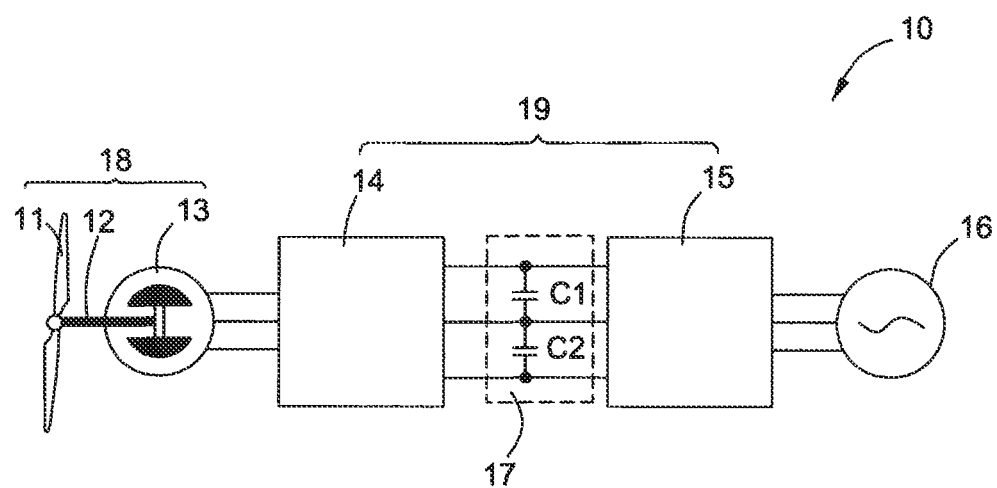
FIG. 1 is a diagram of a power conversion system in accordance with one embodiment.

FIG. 1 shows a diagram of a power conversion system 10 in accordance with one embodiment. The power conversion system 10 illustrates a wind turbine 18 embodiment for purposes of example. In the wind turbine 18, blades 11 are coupled to a shaft 12 which drives a generator 13, either directly or through a gearbox (not shown). The voltage resulting from the generator 13 has a variable frequency that is converted to a fixed frequency by a converter assembly 19 before being supplied to a power grid 16. The converter assembly 19 may include a source-side converter 14 and a line-side converter 15. The source-side converter 14 is electrically coupled to the generator 13 and used to convert alternating current (AC) signals from the generator 13 to direct current (DC) signals. The line-side converter 15 is electrically coupled to the power grid 16 and used to convert DC signals to AC signals for the power grid 16. A DC link 17 is provided for electrically coupling the source-side converter 14 to the line-side converter 15. In one embodiment, as shown in FIG. 1, the DC link 17 may include an upper capacitor C1 and a lower capacitor C2.

For simplicity of illustration, conventional transformer and filter elements between the converter assembly 19 and the power grid 16 are not shown in FIG. 1. Although a wind turbine generator 13 is shown for purposes of example, any type of generator may be included with these embodiments being particularly useful for renewable energy sources such as wind, solar, and hydrokinetic energy powered energy sources. Additionally, although a generator 13 is shown in FIG. 1, the embodiments disclosed herein are applicable to other types of loads such as motors in motor drives and load banks in uninterruptible power supplies (UPSs), for example.

FIG. 2 illustrates a circuit diagram of the converter assembly 19 which is a three-level topological configuration embodiment for purposes of example. The node between the upper capacitor C1 and the lower capacitor C2 acts as a neutral point O. For optimal operation, the same magnitude of voltage should be present on each side of the neutral point O of the DC link 17 (that is, the neutral point voltage should be balanced). In the embodiment of FIG. 2, the same voltage magnitude should be present on each of capacitor C1 and capacitor C2. In this embodiment, neutral point voltage balancing is achieved by pulse width modulation (PWM) signals on switches 149 of the source-side converter 14 or switches 159 of the line-side converter 15, or both. The PWM signals are generated by a duty cycle modulator 300 in response to commands from a control system 100. The arrangement of the switches 149 and 159 of FIG. 2 is for purposes of example. In other embodiments, the arrangement of the switches 149 and 159 may be in other topological configurations, such as five-level or seven-level topological configurations, for example.

Figure 3:
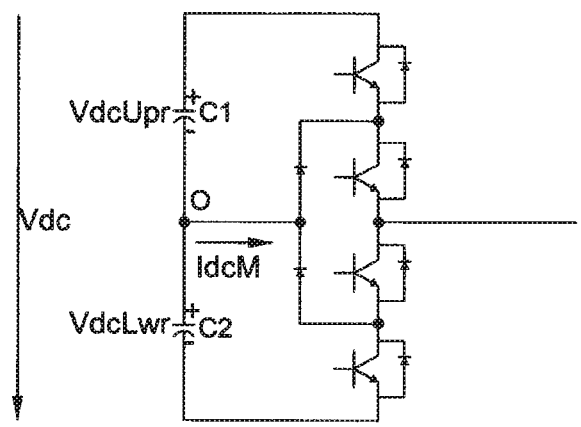
FIG. 3 is a diagram of a single leg of a converter from the circuit diagram of FIG. 2.

FIG. 3 illustrates a single leg of the line-side converter 15 of the converter assembly 19 of FIG. 2. A neutral point voltage imbalance (hereinafter "Δ") at the neutral point O can be determined according to the following formula:

$$\Delta = VdcUpr - VdcLwr = V0 + 1/C \int IdcM \cdot dt \qquad (1)$$

Where, VdcUpr is the voltage on the capacitor C1, VdcLwr is the voltage on the capacitor C2, IdcM is a neutral point current passing through the neutral point O, V0 is an initial neutral point voltage imbalance which is a constant, and C is the capacitance of the capacitor C1 (which in one embodiment is identical to the capacitance of the capacitor C2). That is, the neutral point voltage imbalance Δ can be determined by the neutral point current IdcM. Thus, if the neutral point voltage imbalance Δ needs to be balanced to zero or a determined value, the neutral point current IdcM can be adjusted to balance the neutral point voltage according to the above-mentioned formula (1), which is a neutral point voltage balancing principle.

Referring to FIG. 4, a block diagram of the control system 100 of FIG. 2 in accordance with an embodiment is shown. The control system 100 includes a first compensation control unit 110, a second compensation control unit 120, a fundamental control unit 130, a switch control unit 140, and a switch implementation unit 150. The switch control unit 140 is used to output a switch signal to the switch implementation unit 150 to selectively communicate commands from one of the first compensation control unit 110 and the second compensation control unit 120 to the fundamental control unit 130. In one embodiment, when the power conversion system 10 is in operation in the first state (namely the normal operation state or the high power factor state), the switch implementation unit 150 directs the first compensation control unit 110 to communicate with the fundamental control unit 130 according to the switch signal. When the power conversion system 10 is in operation in the second state (namely the wind free state or the low power factor state), the switch implementation unit 150 directs the second compensation control unit 120 to communicate with the fundamental control unit 130 according to the switch signal. In one embodiment, the first compensation control unit 110, the second compensation control unit 120, the fundamental control unit 130, the switch control unit 140, and the switch implementation unit 150 may be situated in discrete control units and/or algorithms. In other embodiments, two or more of these units may be integrated together in a common control unit and/or algorithm.

The first compensation control unit 110 generates a first compensation command for the fundamental control unit 130 to adjust the command sent to the modulator 300 to balance the neutral point voltage when the power conversion system 10 is in operation in the first state. The second compensation control unit 120 generates a second compensation command for the fundamental control unit 130 to adjust the command to the modulator 300 to balance the neutral point voltage when the power conversion system 10 is in operation in the second state. In other words, the first compensation command is suitable for balancing the neutral point voltage when the power conversion system 10 is in operation in the first state, and the second compensation command is suitable for balancing the neutral point voltage when the power conversion system 10 is in operation in the second state.

Figure 5:
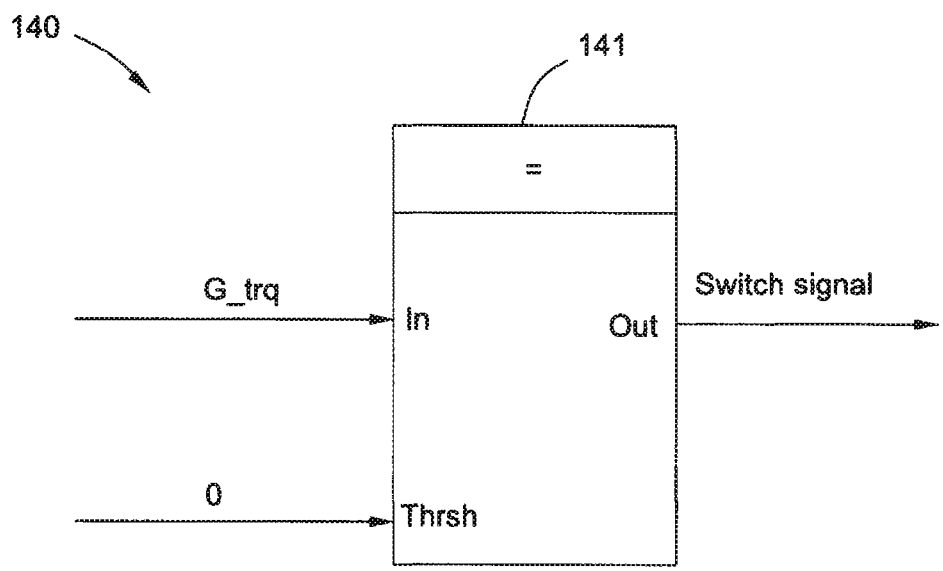
FIG. 5 is a diagram of the switch control unit of FIG. 4 in accordance with one embodiment.

Referring to FIG. 5, a diagram of the switch control unit 140 in accordance with a first embodiment is shown. In this embodiment, the switch control unit 140 includes a comparator element 141. The input terminal In of the comparator element 141 is used to receive a detected torque command G_trq. In one embodiment, the detected torque command G_trq is related to the torque of the generator 13. It is understood that a value of the torque of the generator 13 can be obtained by torque sensors (not shown), for example. As used hereinafter, "1" refers to a high voltage control signal such as a 5 volts voltage signal, and "0" refers to a low voltage control signal such as a 0 volts voltage signal. The threshold terminal Thrsh of the comparator element 141 is used to receive a reference threshold value. In the embodiment of FIG. 5, "0" is shown as an example.

The output terminal Out of the comparator element 141 is used to output the switch signal according to the comparison of the detected torque command G_trq and the reference threshold value "0". In other words, when the power conversion system 10 is in operation in the normal operation state (first state), the detected torque command G_trq will not be equal to zero (namely the power factor is not equal to zero), thus the comparator element 141 will output a switch signal "0" to the switch implementation unit 150 so that any commands from the first compensation control unit 110 will be sent to the fundamental control unit 130. When the power conversion system 10 is in operation in the wind free state (second state) the detected torque command G_trq will be equal to zero (namely the power factor is equal to zero), thus the comparator element 141 will output a switch signal "1" to the switch implementation unit 150 so that any commands from the second compensation control unit 120 will be sent to the fundamental control unit 130. In other embodiments, the comparator element 141 can be substituted by other kinds of algorithm elements with similar functions.

Figure 6:
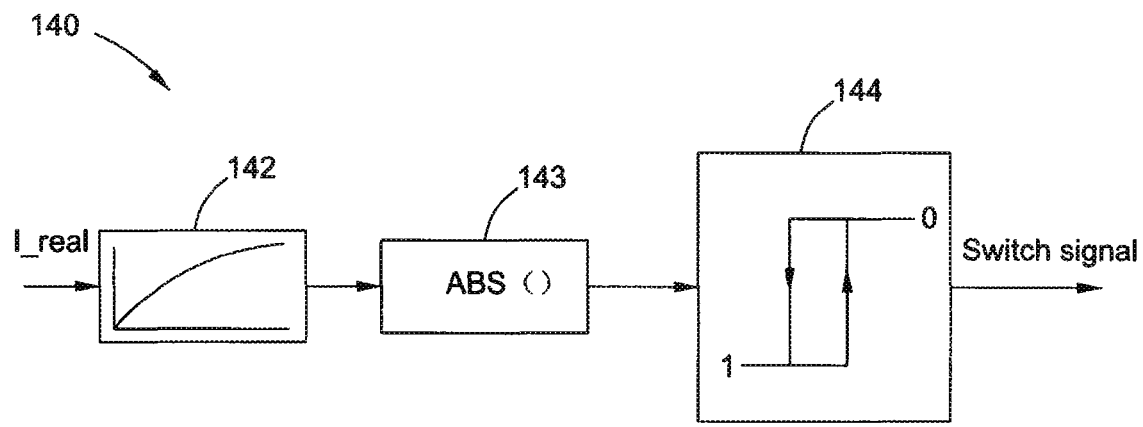
FIG. 6 is a diagram of the switch control unit of FIG. 4 in accordance with another embodiment.

Referring to FIG. 6, a diagram of the switch control unit 140 in accordance with a second embodiment is shown. In this embodiment, the switch control unit 140 includes a filter element 142, an absolute value calculating element 143, and a hysteresis comparator element 144. The filter element 142 is used to receive and filter a detected current command I_real. In one embodiment, the detected current command I_real is related to the root-mean-square value of the active current of the power conversion system 10. The active current of the power conversion system 10 can be obtained by use of current sensors (not shown), for example. The absolute value calculating element 143 is used to obtain the absolute value of the filtered detected current command I_real and output the absolute value to the hysteresis comparator element 144. The hysteresis comparator element 144 is used to output the switch signal according to the output value of the absolute value calculating element 143.

In other words, when the power conversion system 10 is in operation in the high power factor state (first state), the detected current command I_real is greater than a determined value, such as corresponding to the absolute value of power factor being greater than 0.2, thus the hysteresis comparator element 144 will output a switch signal "0" to the switch implementation unit 150 to link the first compensation control unit 110 with the fundamental control unit 130. When the power conversion system 10 is in operation in the low power factor state (second state), the detected current command I_real is less than the determined value, thus the hysteresis comparator element 144 will output a switch signal "1" to the switch implementation unit 150 to link the second compensation control unit 120 with the fundamental control unit 130. In other embodiments, the filter element 142, the absolute value calculating element 143, and the hysteresis comparator element 144 can be substituted with other kinds of algorithm elements with similar functions.

Figure 7:
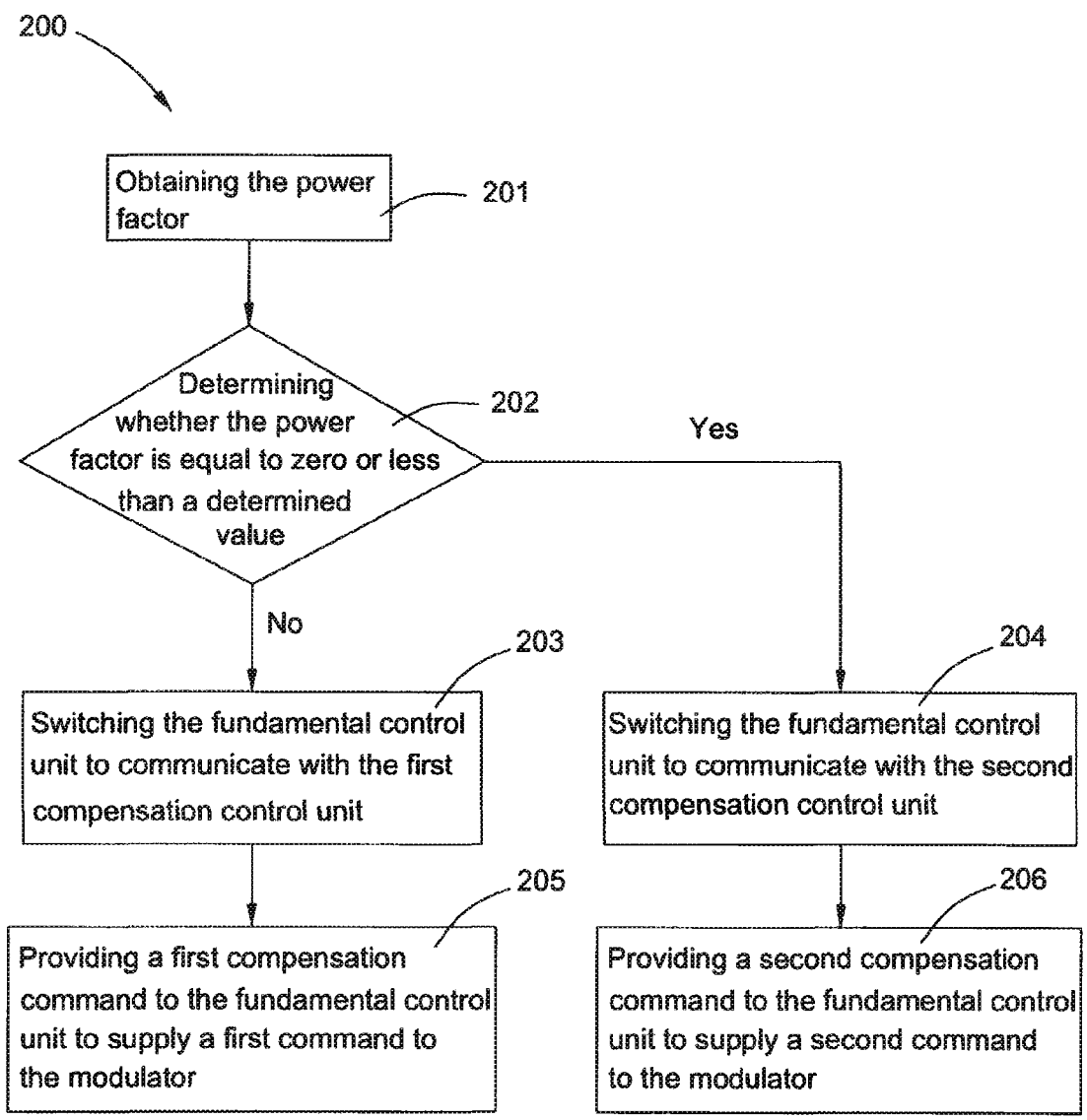
FIG. 7 is a flowchart of a control method in accordance with one embodiment.

Referring to FIG. 7, a flowchart of a control method 200 in accordance with an embodiment corresponding to the control system 100 of FIG. 4 is shown. The control method 200 may be programmed with software instructions stored in a non-transitory computer-readable medium, which, when executed by a processor, perform various steps of the control method 200. The computer-readable medium may include volatile and nonvolatile, removable and non-removable media implemented in any method or technology. The computer-readable medium includes, but is not limited to, RAM, ROM, EEPROM, flash memory, digital signal processor (DSP) or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by an instruction execution system.

In one embodiment, the control method 200 may begin at block 201. At block 201, a power factor of the control system 100 is obtained. In one embodiment the power factor is calculated using a detected torque command G_trq and a detected current command I_real, for example. In other embodiments, the power factor may be obtained by other methods. In this step of block 201, the obtained power factor is used as a reference parameter related to the state of the power conversion system 10. In other embodiments, the reference parameter may comprise a different parameter. In one example, the reference parameter comprises active power.

At block 202, in one embodiment, the obtained power factor (here means absolute value) is compared with zero (such as described with respect to the embodiment of FIG. 5) or a determined value (such as described with respect to the embodiment of FIG. 6), such as 0.2. If the obtained power factor is not equal to zero or is greater than the determined value, the power conversion system 10 is operating in the first state, and then the process goes to the block 203. If the obtained power factor is equal to zero or is less than the determined value, the power conversion system 10 is operating in the second state, and then the process goes to the block 204. Blocks 203 and 204 may be accomplished by either of the methods shown in FIGS. 5 and 6 or by any appropriate other technique.

At block 203, the fundamental control unit 130 is switched to communicate with the first compensation control unit 110. At block 204, the fundamental control unit 130 is switched to communicate with the second compensation control unit 120.

At block 205, the first compensation control unit 110 provides a first compensation command to the fundamental control unit 130 which then supplies a first command to the modulator 300 to balance the neutral point voltage. At block 206, the second compensation control unit 120 provides a second compensation command to the fundamental control unit 130 which then supplies a second command to the modulator 300 to balance the neutral point voltage. This control method 200 involves slightly more computation than embodiments using one compensation calculation and command but offers more flexibility and better performance as the type of compensation that is most useful under the first state is typically not the same as the type of compensation that is most useful under the second state applications.

Figure 8:
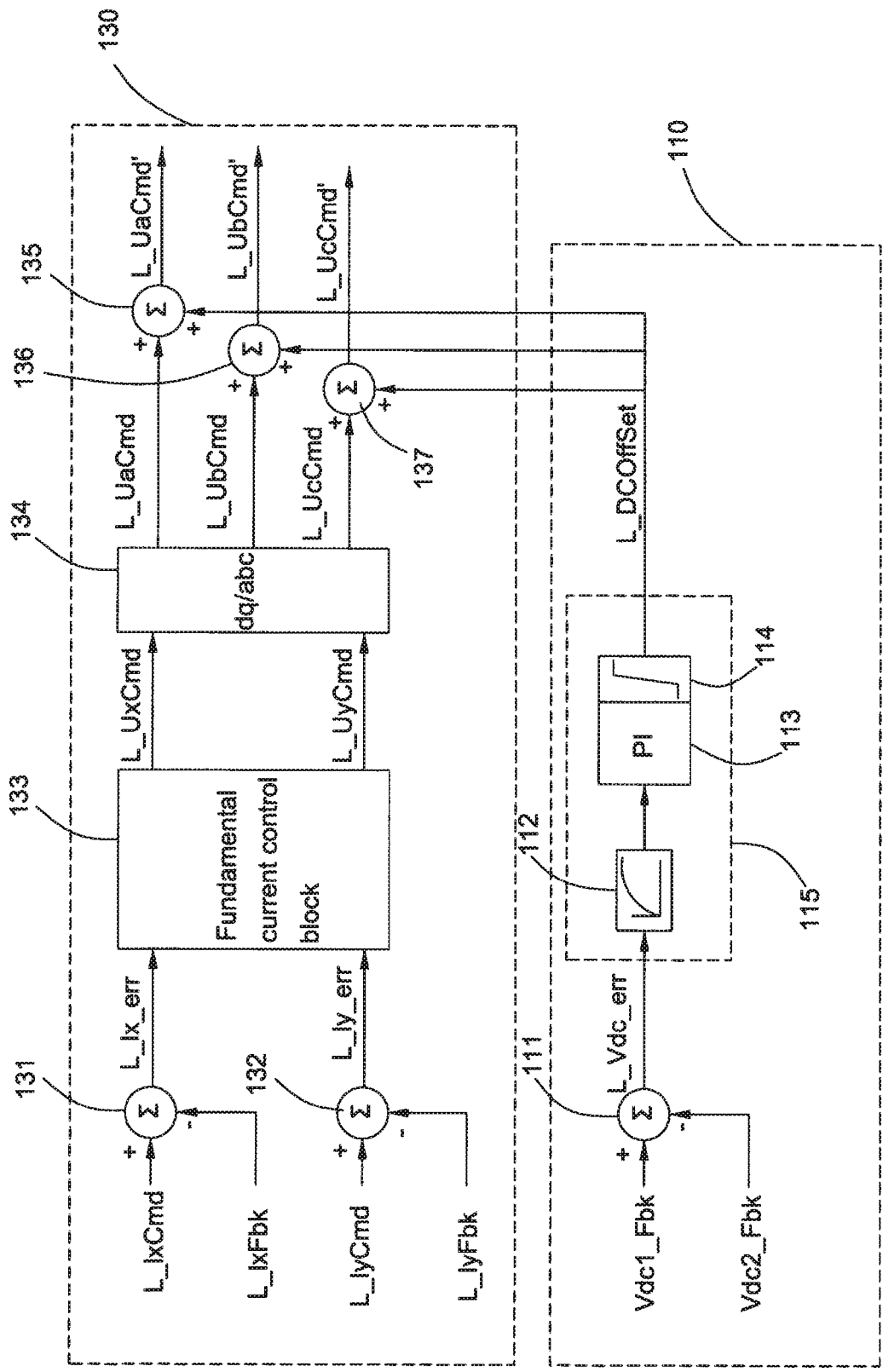
FIG. 8 is a diagram of the first compensation control unit and the fundamental control unit of FIG. 4 in accordance with one embodiment.
Figure 9:
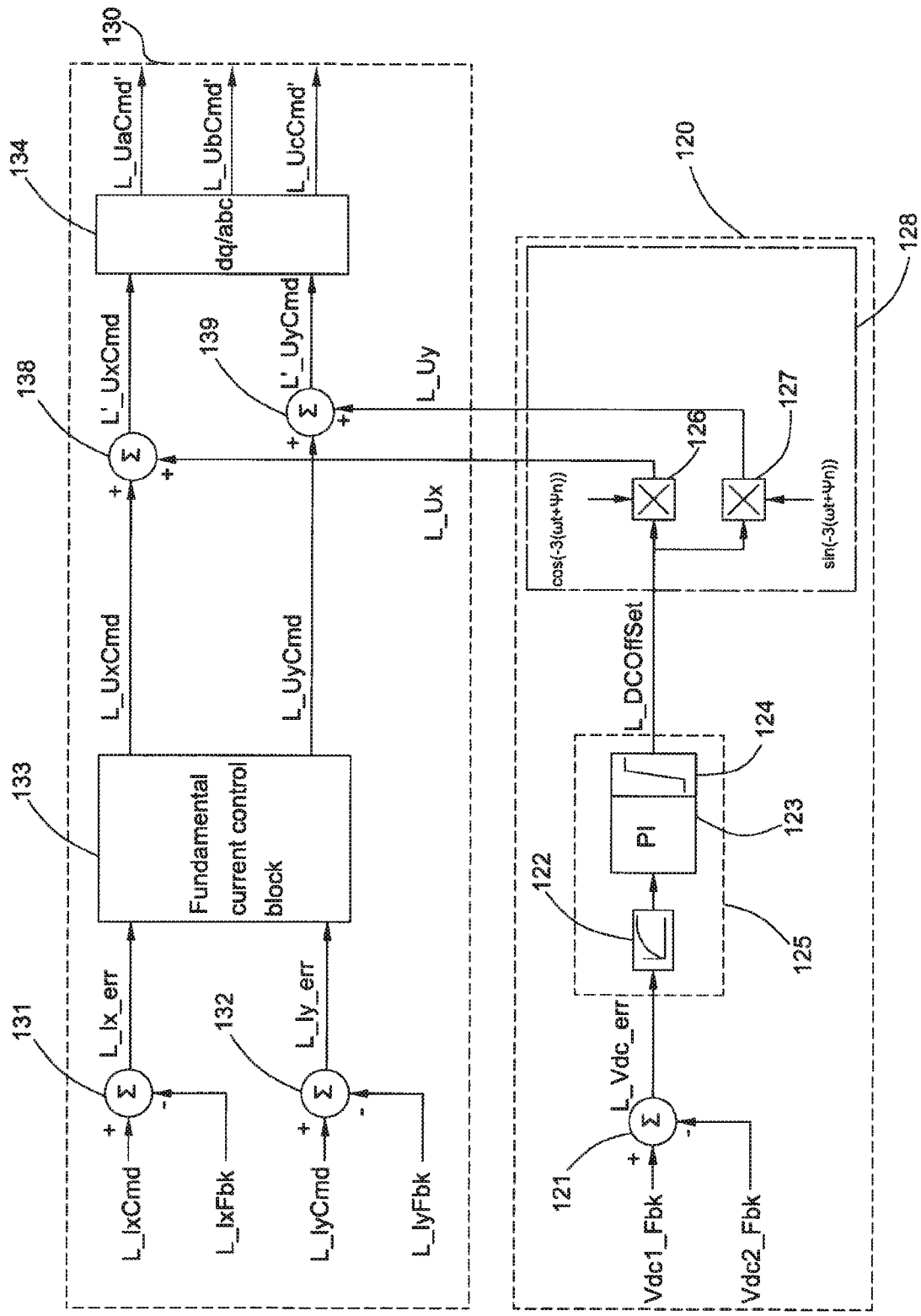
FIG. 9 is a diagram of the second compensation control unit and the fundamental control unit of FIG. 4 in accordance with one embodiment.

FIGS. 8 and 9 illustrate exemplary, non-limiting embodiments of the first compensation control unit 110 and the second compensation control unit 120. For simplicity of illustration, the switch implementation unit 150 between the two compensation control units 110, 120 and the fundamental control unit 130 is not shown in FIGS. 8 and 9.

Referring to FIG. 8, a diagram of the first compensation control unit 110 communicating with the fundamental control unit 130 in accordance with an embodiment is shown. The fundamental control unit 130 is used to generate fundamental commands to be sent to the modulator 300 to control the converter assembly 19 to implement fundamental power conversion without necessarily balancing the neutral point voltage. In the embodiment of FIG. 8, the fundamental control unit 130 includes a first difference element 131, a second difference element 132, a fundamental current control block 133, and a dq/abc transformation block 134. The first difference element 131 is used to obtain an active current error signal L_Ix_err representative of the difference between a real active current command L_IxCmd and a feedback active current command L_IxFbk in dq coordinates. The second difference element 132 is used to obtain a reactive current error signal L_Iy_err representative of the difference between a real reactive current command L_IyCmd and a feedback reactive current command L_IyFbk in dq coordinates. It is understood that the real active current command L_IxCmd, the feedback active current command L_IxFbk, the real reactive current command L_IyCmd, and the feedback reactive current command L_IyFbk can be obtained by obtaining current values from current sensors at the output of the power conversion system and performing calculations on those current values.

The fundamental current control block 133 is used to convert the active current error signal L_Ix_err and the reactive current error signal L_Iy_err to a corresponding active modulating command L_Uxcmd and a corresponding reactive modulating command L_Uxcmd. These modulating commands are used to modulate the duty cycle of the PWM signal of the modulator 300 to control the converter assembly 19. It is understood that the fundamental current control block 133 can use any appropriate method to implement the above function, such as a proportional integral (PI) regulator or a proportional integral differential (PID) regulator, for example.

For implementing available control, the dq/abc transformation block 134 is used to transform the active modulating command L_Uxcmd and reactive modulating command L_Uxcmd in dq coordinates to corresponding fundamental modulating commands L_UaCmd, L_UbCmd, and L_UcCmd in abc coordinates. In one embodiment, the dq/abc transformation block 134 implements Park's transformation algorithm to transform signals from dq coordinates to abc coordinates. The commands L_UaCmd, L_UbCmd, L_UcCmd can directly modulate the duty cycle of the PWM signal of the modulator 300 to control the converter assembly 19 to implement fundamental power conversion.

With continued reference to FIG. 8, for achieving neutral point voltage balance, three summation elements 135, 136, and 137 are further used through the transmission path of the modulating commands L_UaCmd, L_UbCmd, L_UcCmd respectively, to modify the modulating commands so as to achieve neutral point voltage balance. In one embodiment, the first compensation control unit 110 includes a third difference element 111 and a neutral point voltage regulator 115. The third difference element 111 is used to obtain a voltage error signal L_Vdc_err representative of the neutral point voltage imbalance $\Delta$ which is calculated from the difference between a feedback voltage command Vdc1_Fbk on the capacitor C1 and a feedback voltage command Vdc2_Fbk on the capacitor C2. The neutral point voltage regulator 115 receives the voltage error signal L_Vdc_err and produces a fundamental compensation command L_DCOffSet (injected DC offset) for driving the voltage error signal L_Vdc_err towards zero.

In one embodiment, the neutral point voltage regulator 115 may include a filter element 112 and a PI regulator 113 combined with a limiter 114. In other embodiments, the neutral point voltage regulator 115 may use other elements and/or algorithms to obtain the fundamental compensation command L_DCOffSet. The fundamental compensation command L_DCOffSet as the first compensation command (also DC injection signal) is injected to the three summation elements 135, 136, and 137. Thus, three phase commands L_UaCmd', L_UbCmd', and L_UcCmd' are respectively produced from the three summation elements 135, 136, and 137 to modulate the duty cycle of the PWM signal of the modulator 300 to control the converter assembly 19 to implement fundamental power conversion while balancing the neutral point voltage.

If the source-side converter 14 uses the algorithm configuration of the fundamental control unit 130 combined the first compensation control unit 110, but the line-side converter 15 only uses the algorithm configuration of the fundamental control unit 130, and if it is assumed $I_{out}=I_M \sin(\omega t+\phi)$;

$U_{out}=A\sin(\omega t)+\delta$; $0<\Delta<\Delta<1$; $\omega=2\pi f$, the neutral point current $I_{dcM}$ can be determined according to the following formula:

$$I_{dcM} \approx \frac{4\sqrt{3}\,\Delta}{(1-\Delta^2)\pi}\frac{P_{active}}{V_{dc}}\left(\frac{1}{MI_G}-\frac{1}{MI_L}\right)+\frac{4\sqrt{3}\,\delta}{(1-\Delta^2)\pi}\frac{P_{active}}{V_{dc}}\frac{1}{MI_G} \qquad (2)$$

where $P_{active}$ is the active power of the power conversion system 10, $MI_G$ is the modulation index of the source-side converter 14, $MI_L$ is the modulation index of the line-side converter 15, Vdc is the voltage of the DC link 17, $\delta$ is the injected DC offset generated from the first compensation control unit 110, $I_{out}$ is output current of the power conversion system 10, $U_{out}$ is output voltage of the power conversion system 10, $\phi$ is power factor angle, $I_M$ is current amplitude, A is voltage amplitude, f represents frequency, t represents time.

According to the above formula (2), if the active power $P_{active}$ is equal to zero (namely the power factor is equal to zero), the neutral point current $I_{dcM}$ is thus equal to zero, and the neutral point voltage cannot be balanced by adjusting the neutral point current $I_{dcM}$ according to the formula (1) in the wind free state. In other words, the first compensation control unit 110 works for balancing the neutral point voltage when the power conversion system 10 is in operation in a normal operation state but does not work well for balancing the neutral point voltage when the power conversion system 10 is in operation in the wind free state. Furthermore, in some situations, the first compensation control unit 110 cannot work well for balancing the neutral point voltage when the power conversion system 10 is in operation in the low power factor state, but can work well for balancing the neutral point voltage when the power conversion system 10 is in operation in the high power factor state. In other words, the first compensation control unit 110 may be suitable for balancing the neutral point voltage when the power conversion system 10 is in operation in the first state.

Referring to FIG. 9, a diagram of the second compensation control unit 120 communicating with the fundamental control unit 130 in accordance with one embodiment is shown. In the illustrated embodiment, the second compensation control unit 120 includes a fourth difference element 121 and a neutral point voltage regulator 125 having a filter element 122 and a PI regulator 123 combined with a limiter 124. The fourth difference element 121 and the neutral point voltage regulator 125 have the same function as the third difference element 112 and the neutral point voltage regulator 115 and are thus not described here again. The difference between the second compensation control unit 120 and the first compensation control unit 110 is that the second compensation control unit 120 further includes an odd harmonics signal generator 128 used to transform the DC injection signal L_DCOffSet to odd harmonics signals L_Ux and L_Uy in dq coordinates as the second compensation command.

In the embodiment of FIG. 9, the odd harmonics signal generator 128 includes a first multiplying element 126 and a second multiplying element 127. The first multiplying element 126 is used to obtain the odd harmonics signal L_Ux by multiplying the DC injection signal L_DCOffSet and a first angular signal $\cos(-3(\omega t+\psi_n))$. The second multiplying element 127 is used to obtain the odd harmonics signal L_Uy by multiplying the DC injection signal L_DCOffSet and a second angular signal $\sin(-3(\omega t+\psi_n))$. Here, $\omega=2\pi f$, $\psi_n=(n-1)(\theta+\pi/2(n-1))/n$, $\theta=a\tan(L\_Uycmd/L\_Uxcmd)$, wherein $\psi_n$ is injected harmonic angle, n is order of harmonic injected in dq coordinate, f represents frequency, t represents time. For example, if n=3, $\psi_n=(3-1)(\theta+\pi/2(3-1))/3=(2/3)\cdot[a\tan(L\_Uycmd/L\_Uxcmd)+\pi/4]$. In other embodiments, n can be other odd numbers, such as 5, 7, 9, etc.

With continued reference to FIG. 9, for achieving neutral point voltage balance, two summation elements 138 and 139 are further used through the transmitting path of the active modulating command L_Uxcmd and the reactive modulating command L_Uycmd respectively in the fundamental control unit 110. The summation elements 138 and 139 respectively generate two sum commands L'_Uxcmd and L'_Uycmd by summing the command L_Uxcmd and the command L_Ux, and summing the command L_Uycmd and the command L_Uy.

For implementing available control, the dq/abc transformation block 134 is used to transform the commands L'_Uxcmd and L'_Uycmd in dq coordinates to corresponding three phase commands L_UaCmd', L_UbCmd', and L_UcCmd', in abc coordinates. Thus, the three phase commands L_UaCmd', L_UbCmd', and L_UcCmd' can be used to modulate the duty cycle of the PWM signal of the modulator 300 to control the converter assembly 19 to implement fundamental power conversion operation from the generator 13 to the grid 16 together with balancing the neutral point voltage.

Referring to FIG. 10, a diagram of the neutral point (Midpoint) current $I_{dcM}$, as a function of a neutral point voltage imbalance Δ using the second compensation unit 120 and working in the normal operation state is shown. In FIG. 10, a wave 301 is related to the state that the power factor (PF) is equal to 1.0, a wave 302 is related to the state that the power factor (PF) is equal to 0.9, a wave 303 is related to the state that the power factor (PF) is equal to 0.5. FIG. 10 illustrates that when the power conversion system 10 is in operation in a high power factor state, the second compensation unit 120 does not work as well for balancing the neutral point voltage, such as PF=1.0 and PF=0.9. When the power conversion system 10 is in operation in a low power factor state, the second compensation unit 120 can work well for balancing the neutral point voltage, such as PF=0.5.

Referring to FIG. 11, a diagram of the neutral point current $I_{dcM}$, as a function of a neutral point voltage imbalance Δ using the second compensation unit 120 and working in the wind free state is shown. In FIG. 11, a wave 401 is related to the state that the fundamental voltage magnitude (A1) is equal to 0.9, a wave 402 is related to the state that the fundamental voltage magnitude (A1) is equal to 0.8, a wave 403 is related to the state that the fundamental voltage magnitude (A1) is equal to 0.6. FIG. 10 illustrates that when the power conversion system 10 is in operation in the wind free state, the second compensation unit 120 can work well for balancing the neutral point voltage. According to FIGS. 10 and 11, the second compensation control unit 120 is thus suitable for balancing the neutral point voltage when the power conversion system 10 is in operation in the second state. Thus, in each instance, selection of the proper state is beneficial to obtaining the best control response among the first and second compensation signals.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for providing commands to a multi-level converter for balancing a neutral point voltage of the multi-level converter, the control system comprising:
   a fundamental control unit configured to generate fundamental commands to implement fundamental power conversion operation for the multi-level converter;
   a first compensation control unit configured to generate a first compensation signal for injection into the fundamental commands to balance the neutral point voltage when the multi-level converter is in operation in a first state;
   a second compensation control unit configured to generate a second compensation signal for injection into the fundamental commands to balance the neutral point voltage when the multi-level converter is in operation in a second state, wherein the first state is different from the second state;
   a switch control unit configured to detect the state of the multi-level converter and provide a first switch signal and a second switch signal respectively corresponding to the first state and the second state; and
   a switch implementation unit configured to switch the fundamental control unit to communicate with the first compensation control unit according to the first switch signal and switch the fundamental control unit to communicate with the second compensation control unit according to the second switch signal.

2. The control system of claim 1, wherein the control system is embodied in a wind turbine, wherein the first state comprises a normal operation state, and wherein the second state comprises a wind free state.

3. The control system of claim 2, wherein the switch control unit comprises a comparator element comprising:
   an input terminal configured to receive a detected torque command of the multi-level converter;
   a threshold terminal configured to receive a zero value; and
   an output terminal configured to, when the detected torque command is not equal to the zero value, outputing the first switch signal, or, when the detected torque command is equal to the zero value, output the second switch signal.

4. The control system of claim 1, wherein the first state comprises a higher power factor state, and wherein the second state comprises a low power factor state.

5. The control system of claim 4, wherein the switch control unit comprises:
   a filter element configured to filter a detected current command related to the root-mean-square value of an active current of the multi-level converter;
   an absolute value calculating element configured to obtain an absolute value of the filtered detected current command; and
   a hysteresis comparator element configured to provide the first switch signal and the second switch signal according to the absolute value of the absolute value calculating element.

6. The control system of claim 1, wherein the fundamental control unit comprises:
   a first difference element configured to obtain an active current error signal;
   a second difference element configured to obtain a reactive current error signal;
   a fundamental current control block configured to convert the active current error signal and the reactive current error signal to an active modulating command and a reactive modulating command in dq coordiantes respectively; and
   a dq/abc transformation block configured to transform the active modulating command and the reactive modulating command in dq coordinates to corresponding fundamental modulating commands in abc coordinates.

7. The control system of claim 6, wherein the first compensation control unit further comprises:
   a third difference element configured to obtain a voltage error signal representative of neutral point voltage imbalance; and
   a neutral point voltage regulator configured to receive the voltage error signal and provide a fundamental compensation command for injection into the fundamental modulating commands and driving the voltage error signal towards zero.

8. The control system of claim 7, wherein the neutral point voltage regulator comprises a filter element and a proportional integral (PI) regulator combined with a limiter.

9. The control system of claim 6, wherein the second compensation control unit comprises:
   a third difference element configured to obtain a voltage error signal representative of neutral point voltage imbalance;
   a neutral point voltage regulator configured to receive the voltage error signal and produce a fundamental compensation command for driving the voltage error signal towards zero; and
   an odd harmonics signal generator configured to transform the fundamental compensation command to odd harmonics signals in dq coordinates for injection into the active modulating command and the reactive modulating command.

10. The control system of claim 9, wherein the odd harmonics signal generator comprises:
    a first multiplying element configured to obtain a first odd harmonics signal by multiplying the fundamental compensation command and a first angular signal; and
    a second multiplying element configured to obtain a second odd harmonics signal by multiplying the fundamental compensation command and a second angular signal.

11. The control system of claim 10, wherein the first angular signal comprises $\cos(-3(\omega t+\psi_n))$, and the second angular signal comprises $\sin(-3(\omega t+\psi_n))$, $\omega=2\pi f$, $\psi_n=(n-1)(\theta+\pi/2(n-1))/n$, $\theta=a\tan(L\_Uycmd/L\_Uxcmd)$, wherein $\psi_n$ comprises an injected harmonic angle, n comprises an order of harmonic injected in the dq coordinate, f represents frequency, t represents time, L_Uxcmd and L_Uycmd are respectively the active modulating command and the reactive modulating command, and n is an odd number.

12. The control system of claim 11, wherein the multi-level converter comprises a three-level converter, and n is equal to three.

13. A control method for balancing a neutral point voltage of a multi-level converter, the control method comprising:
    obtaining a reference parameter related to the state of the multi-lever converter;
    determining the state of the multi-lever converter according to the reference parameter;
    generating a fundamental command from a fundamental control unit to implement fundamental power conversion of the multi-level converter;
    when the state of the multi-level converter is in a first state, switching the fundamental control unit to communicate with a first compensation control unit, generating a first compensation signal with the first compensation control unit, and injecting the first compensation signal into the fundamental command to balance the neutral point voltage of the multi-level converter; and when the state of the multi-level converter is in a second state, switching the fundamental control unit to communicate with a second compensation control unit, generating a second compensation signal with the second compensation control unit, and injecting the second compensation signal into the fundamental command to balance the neutral point voltage of the multi-level converter, wherein the first state is different from the second state.

14. The control method of claim 13, wherein the reference parameter comprises a power factor of the multi-level converter, and wherein determining the state of the multi-level converter according to the reference parameter comprises:

determining whether the power factor is equal to zero or less than a determined value;

when the power factor is equal to zero or is less than the determined value, identifying the second state; and when the power factor is not equal to zero or is greater than the determined value, identifying the first state.

15. The control method of claim 13, wherein the second compensation signal comprises odd harmonics signals in the dq coordinate.

16. The control method of claim 15, wherein the odd harmonics signals comprise:

a first odd harmonics signal generated by multiplying a fundamental compensation command and a first angular signal; and a second odd harmonics signal generated by multiplying the fundamental compensation command and a second angular signal.

17. A compensation control unit for providing a compensation command for balancing a neutral point voltage of a multi-level converter, the compensation control unit comprising:

a difference element configured to obtain a voltage error signal representative of neutral point voltage imbalance;

a neutral point voltage regulator configured to receive the voltage error signal and produce a fundamental compensation command for driving the voltage error signal towards zero; and an odd harmonics signal generator configured to transform the fundamental compensation command to odd harmonics signals in the dq coordinates.

18. The compensation control unit of claim 17, wherein the odd harmonics signal generator comprises a first multiplying element and a second multiplying element, wherein the first multiplying element is configured to obtain a first odd harmonics signal by multiplying the fundamental compensation command and a first angular signal, and the second multiplying element is configured to obtain a second odd harmonics signal by multiplying the fundamental compensation command and a second angular signal.

19. The compensation control unit of claim 18, wherein the first angular signal comprises $\cos(-3(\omega t+\psi n))$, and the second angular signal comprises $\sin(-3(\omega t+\psi n))$, $\omega=2\pi f$, $\psi n = (n-1)(\theta+\pi/2(n-1))/n$, $\theta=\operatorname{atan}(L\_Uycmd/L\_Uxcmd)$, wherein $\psi n$, comprises an injected harmonic angle, n comprises an order of harmonic injected in the dq coordinate, f represents frequency, t represents time, $L\_Uxcmd$ and $L\_Uycmd$ are respectively an active modulating command and a reactive modulating command, and n is an odd number.

20. The compensation control unit of claim 17, wherein the compensation control unit is embodied in a wind turbine power generation system, and wherein the compensation command is configured to balance the neutral point voltage of the multi-level converter when the multi-level converter is in operation in a wind free state or a low power factor state.

* * * * *